(12) United States Patent
Kolbly

(10) Patent No.: US 9,344,331 B2
(45) Date of Patent: May 17, 2016

(54) IMPLEMENTATION OF NETWORK DEVICE COMPONENTS IN NETWORK DEVICES

(75) Inventor: Donovan M. Kolbly, Austin, TX (US)

(73) Assignee: Trend Micro Incorporated, Tokyo (JP)

(*) Notice: Subject to any disclaimer, the term of this patent is extended or adjusted under 35 U.S.C. 154(b) by 0 days.

(21) Appl. No.: 14/112,644

(22) PCT Filed: May 25, 2011

(86) PCT No.: PCT/US2011/037887
§ 371 (c)(1),
(2), (4) Date: Oct. 18, 2013

(87) PCT Pub. No.: WO2012/161707
PCT Pub. Date: Nov. 29, 2012

(65) Prior Publication Data
US 2014/0059189 A1     Feb. 27, 2014

(51) Int. Cl.
*G06F 15/16* (2006.01)
*H04L 12/24* (2006.01)
*G06F 9/445* (2006.01)

(52) U.S. Cl.
CPC ............ *H04L 41/0803* (2013.01); *G06F 8/64* (2013.01)

(58) Field of Classification Search
CPC ... G06F 8/443; G06F 8/4442; G06F 11/3466; G06F 8/64; H04L 41/0803
See application file for complete search history.

(56) References Cited

U.S. PATENT DOCUMENTS

| | | | | |
|---|---|---|---|---|
| 6,496,979 B1 * | 12/2002 | Chen | ......................... | G06F 8/61 717/178 |
| 7,844,945 B2 * | 11/2010 | Bhagia | ...................... | G06F 8/61 717/107 |
| 8,346,860 B2 * | 1/2013 | Berg | ..................... | H04J 3/0667 709/203 |
| 8,694,988 B2 * | 4/2014 | Goldman | ............ | G06F 9/44526 717/162 |
| 8,966,024 B2 * | 2/2015 | Koponen | ............ | H04L 41/0823 709/220 |
| 8,966,029 B2 * | 2/2015 | Zhang | ................ | H04L 41/0823 709/220 |

(Continued)

FOREIGN PATENT DOCUMENTS

| | | |
|---|---|---|
| CN | 1560740 A | 1/2005 |
| CN | 1790267 A | 6/2006 |

(Continued)

OTHER PUBLICATIONS

Ellul et al., Run-time compilation of bytecode in wireless sensor networks, Apr. 2010, 2 pages.*

(Continued)

*Primary Examiner* — Thuy Dao
(74) *Attorney, Agent, or Firm* — Okamoto & Benedicto LLP

(57) ABSTRACT

A network device includes an execution engine having an implementation of a network device component to process data received by the network device, and a compiler to dynamically generate the implementation of the network device component through compilation of a general representation using network device data for compiler optimization.

13 Claims, 4 Drawing Sheets

(56) References Cited

U.S. PATENT DOCUMENTS

| | | | |
|---|---|---|---|
| 9,116,608 B2* | 8/2015 | Koo | H04W 4/206 |
| 2001/0042241 A1 | 11/2001 | Tsuboi | |
| 2005/0055350 A1 | 3/2005 | Werme et al. | |
| 2005/0125514 A1 | 6/2005 | Balakrishnan | |
| 2006/0048114 A1 | 3/2006 | Schmidt | |
| 2006/0101511 A1 | 5/2006 | Faillenot et al. | |
| 2006/0143601 A1* | 6/2006 | Concha | G06F 8/61 717/170 |
| 2007/0266370 A1 | 11/2007 | Myers et al. | |
| 2009/0013210 A1* | 1/2009 | McIntosh et al. | 714/4 |
| 2009/0276766 A1* | 11/2009 | Song et al. | 717/159 |
| 2010/0185679 A1 | 7/2010 | Ferrazzini et al. | |
| 2010/0257515 A1* | 10/2010 | Bates et al. | 717/145 |
| 2011/0164506 A1* | 7/2011 | Stavrou | H04L 43/12 370/241 |
| 2011/0209128 A1* | 8/2011 | Nikara et al. | 717/140 |
| 2014/0108600 A1* | 4/2014 | Cabillic | G06F 8/71 709/217 |
| 2014/0344453 A1* | 11/2014 | Varney | H04L 67/10 709/224 |
| 2015/0088982 A1* | 3/2015 | Johnson | H04L 67/34 709/203 |

FOREIGN PATENT DOCUMENTS

| | | |
|---|---|---|
| EP | 2042987 A2 | 4/2009 |
| WO | WO-03098461 A1 | 11/2003 |

OTHER PUBLICATIONS

Ozturk et al., Compiler directed network-on-chip reliability enhancement for chip multiprocessors, 2010, 10 pages.*

Gu et al., Phase-based adaptive recompilation in a JVM, Apr. 2008, 11 pages.*

Suganuma et al., Design and evaluation of dynamic optimizations for a Java just-in-time compiler, Jul. 2005, 54 pages.*

Nuzman et al., JIT technology with C/C++: Feedback-directed dynamic recompilation for statically compiled languages, Dec. 2013, 25 pages.*

Reiss, Frederick et al; Efficient Analysis of Live and Historical Streaming Data and Its Application to Cybersecurity; http://citeseerx.ist.psu.edu/viewdoc/summary?doi=10.1.1.80.9539> Publication Date: Jul. 13, 2006.

European Search Report received in EP Application No. 11865997.8, Feb. 18, 2015, 3 pages.

International Preliminary Report on Patentability received in PCT Application No. PCT/US2011/037887, Dec. 5, 2013, 5 pages.

International Search Report & Written Opinion received in PCT Application No. PCT/US2011/037887, Feb. 9, 2012, 8 pages.

Thibault, S. et al., "Safe and Efficient Active Network Programming," Reliable Distributed Systems, 1998, Proceedings Seventeenth IEEE Symposium on, IEEE, 1998, 9 pages.

* cited by examiner

IMPLEMENTATION OF NETWORK DEVICE COMPONENTS IN NETWORK DEVICES

BACKGROUND

Computer networks include various devices that facilitate communication between computers, such as routers, switches, firewalls, management appliances, security appliances, and the like (generally referred to as "network devices"), A network device can include various functions implemented by different components ("network device components"). Some network device components are required to be changed during the life of the network device (e.g., modifying components in the field). For example, a network device can include a network security component for implementing a particular security function (e.g., a security filter for filtering packets to identify a particular type of attack). As new types of security vulnerabilities are discovered, network security components should be updated to compensate for the new threats. Thus, network devices can include the capability of modifying the implementation of their respective network device components.

BRIEF DESCRIPTION OF THE DRAWINGS

Some embodiments of the invention are described with respect to the following figures.

DETAILED DESCRIPTION

Implementation of network device components in network devices is described. Various approaches can be used to install and update network device components in network devices. In one approach, a network device receives a network device component in source form (e.g., a programming language form), The network device then evaluates the source using an interpreter to implement the network device component. In another approach, a network device receives a network device component in executable form (e.g., machine code having native instructions of a particular processor). A vendor can compile source offline (e.g., external to the network device) and then provide the executable to the network device to implement the network device component.

The interpretive approach can only achieve high performance using specialized interpretation, a complex and limited technique. At the same time, a specialized interpreter has limited notation that can limit the types of network device components that can be implemented. The interpreter can be generalized, but at the cost of performance. The external compilation approach provides higher performance, but the resultant executable is hardware-dependent. The same executable cannot be delivered to network devices having different architectures (e.g., MIPS, x86, etc.). This requires the vendor to produce several different executables for different network devices. Further, the approaches discussed above do not incorporate network device data, such as deployment-specific data (e.g., internet protocol (IP) addresses, network deployment localities, etc.) and domain-specific runtime data (e.g., traffic dependent statistics) into the network device component implementation. Both approaches must instead extract network device information from memory in the network device, resulting in significant overhead costs and decrease in performance of the network device component.

In an embodiment, an execution engine in a network device includes an implementation of a network device component that processes data received by the network device. A compiler in the network device dynamically generates the implementation of the network device component through compilation of a general representation using network device data for compiler optimization. Co-location of the compilation process and the execution engine in the network device provides both increased performance and hardware independence. The general representation can be portable to network devices having different architectures. By producing executable code, overhead associated with interpretation is avoided. Further, network device data is used for compiler optimization, allowing for device-specific optimizations in the executable representation. Various embodiments are described below by referring to several examples.

Figure 1:
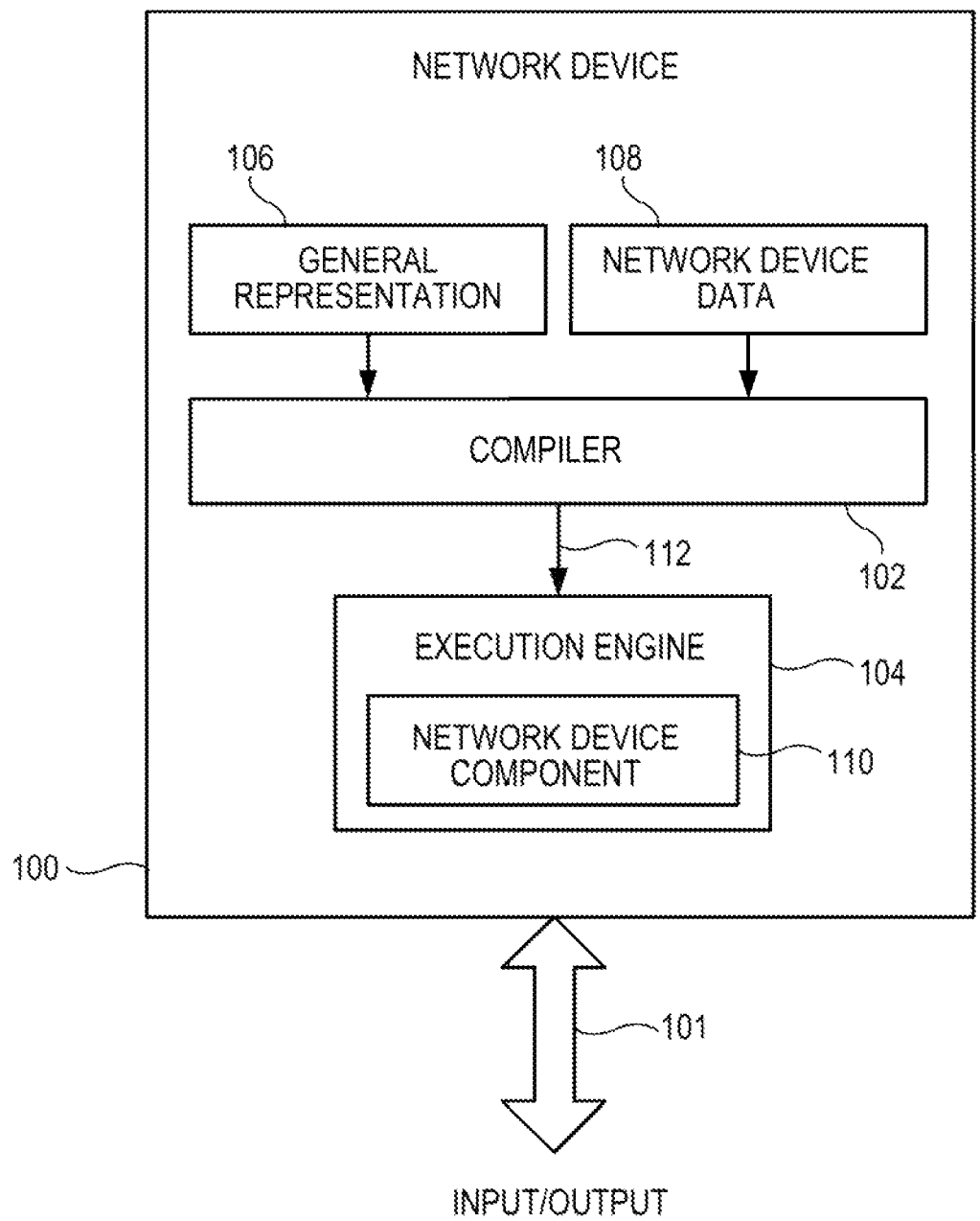
FIG. 1 is a block diagram of a network device according to an example implementation.

FIG. 1 is a block diagram of a network device 100 according to an example implementation. The network device 100 generally receives and transmits data, such as traffic on a computer network, via an input/output (IO) interface 101. The network device 100 can be any type of network device, such as a router, switch, firewall, security appliance, management appliance, and like type devices that facilitate communication in a computer network. The network device 100 includes a compiler 102 and an execution engine 104. The network device 100 stores a general representation 106 and network device data 108, The execution engine 104 includes an implementation of a network device component 110.

The general representation 106 includes a human-readable or partially human-readable description of the network device component. The general representation 106 can include source code that defines the network device component. The source code can be written using a programming language (e.g., C or C++), a markup language (e.g., extensible markup language (XML)), or like type source languages. In an example, a portion of the source code can be pre-compiled external to the network device 100. Thus, the general representation 106 can have a human-readable portion (e.g., source code) and a machine-readable portion (e.g., machine or object code pre-compiled from source), or a human-readable portion without a pre-compiled portion. Any pre-compiled portion of the general representation 106 can be device-independent such that the general representation 106 can be deployed to network devices having various hardware architectures. Any source code portion of the general representation 106 can also be device-independent. The network device 100 can receive the general representation 106 through the IO interface 101 (e.g., the general representation 106 can be sent to the network device 100 over a network).

The network device data 108 includes domain-specific data generated by or for the network device 100. "Domain-specific" data includes data related to the particular functionality or "domain" of the network device 100. Thus, if the network device 100 processes packets of data, then the network device data 108 can include data related to the function of packet processing. In an example, the network device data 108 can include data used to configure the network device 100 ("configuration data"). The configuration data can include parameters, attributes, settings, and the like that are particular to the deployment of the network device 100 in a network (e.g., particular internet protocol (IP) addresses, network deployment localities, etc.). In another example, the network device data 108 can include data generated by the network device 100 during operation or "runtime" ("runtime data"). The runtime data can include statistics, or any analysis of such statistics, generated by the network device 100 (e.g., during packet processing). The runtime data can be generated by any network device component of the network device 100. In an example, the runtime data is generated by an implementation of the network device component 110 in the execution engine 104. The network device data 108 can include any combination of configuration data and runtime data.

The compiler 102 obtains the general representation 106 as parametric input. The compiler 102 processes the general representation 106 to generate an executable representation 112. The executable representation 112 can include code that is executable by the execution engine 104 (e.g., machine code) to implement the network device component 110. The general representation 106 can be modified during the life of the network device 100 (e.g., upgraded, patched, etc.) any number of times. Upon receiving a new version of the general representation 106, the compiler 102 can generate a new executable representation 112 thereby generating a new implementation of the network device component 110. Thus, the compiler 102 can dynamically generate the executable representation 112 within the network device 100.

The compiler 102 can also obtain the network device data 108 as parametric input. The compiler 102 can use the network device data 108 for compiler optimization when generating the executable representation 112. That is, the executable representation 112 can be "optimized" for the network device 100 based on the network device data 108.

The compiler 102 can use configuration data in the network device data 108 to include device-dependent parameters in the executable representation 112 (e.g., "hard-coded" parameters specific to the configuration of the network device 100). For example, the compiler 102 can hard code particular IP addresses configured for the network device 100 into the executable representation 112. In this manner, the execution engine 104 can obtain device-dependent parameters from the instruction stream (e.g., from the executable representation 112 itself), rather than having to introduce overhead of obtaining the parameters from data memory in the network device 100. The compiler 102 can use runtime data in the network device data 108 to configure the executable representation 112 operate with better performance given particular traffic processed by the network device 100. For example, the network device component can be a security component that analyzes traffic. The network device 100 can collect traffic statistics during operation, such as a large amount of user datagram protocol (UDP) traffic on port 53, because the network device 100 may be fronting a large domain name service (DNS) farm. The compiler 102 can use such traffic statistics to optimize a comparison tree in the executable representation 112 so that the common case of UDP traffic on port 53 is processed faster. In general, the compiler 102 can use the runtime data to perform domain-specific optimization of the executable representation 112.

From the above examples, it can be seen that the compiler 102 can insert various optimizations in the resultant executable representation 112 based on the network device data 108.

The execution engine 104 obtains the executable representation 112 as parametric input. The execution engine 104 implements the network device component 110 through execution of the executable representation 112. The network device component 110 can be any type of function performed by the network device 100, such as a switching function, a routing function, a security function, and the like. The network device component 110 can process traffic received by the network device 100 on the IO interface 101. The network device component 110 can be installed by providing the general representation 106 to the network device 100. The network device component 110 can be modified (e.g., upgraded, patched, etc.) by providing a new version of the general representation 106, or by some other command (e.g., command to modify the network device component 110 to incorporate optimizations based on new network device data 108.)

Figure 2:
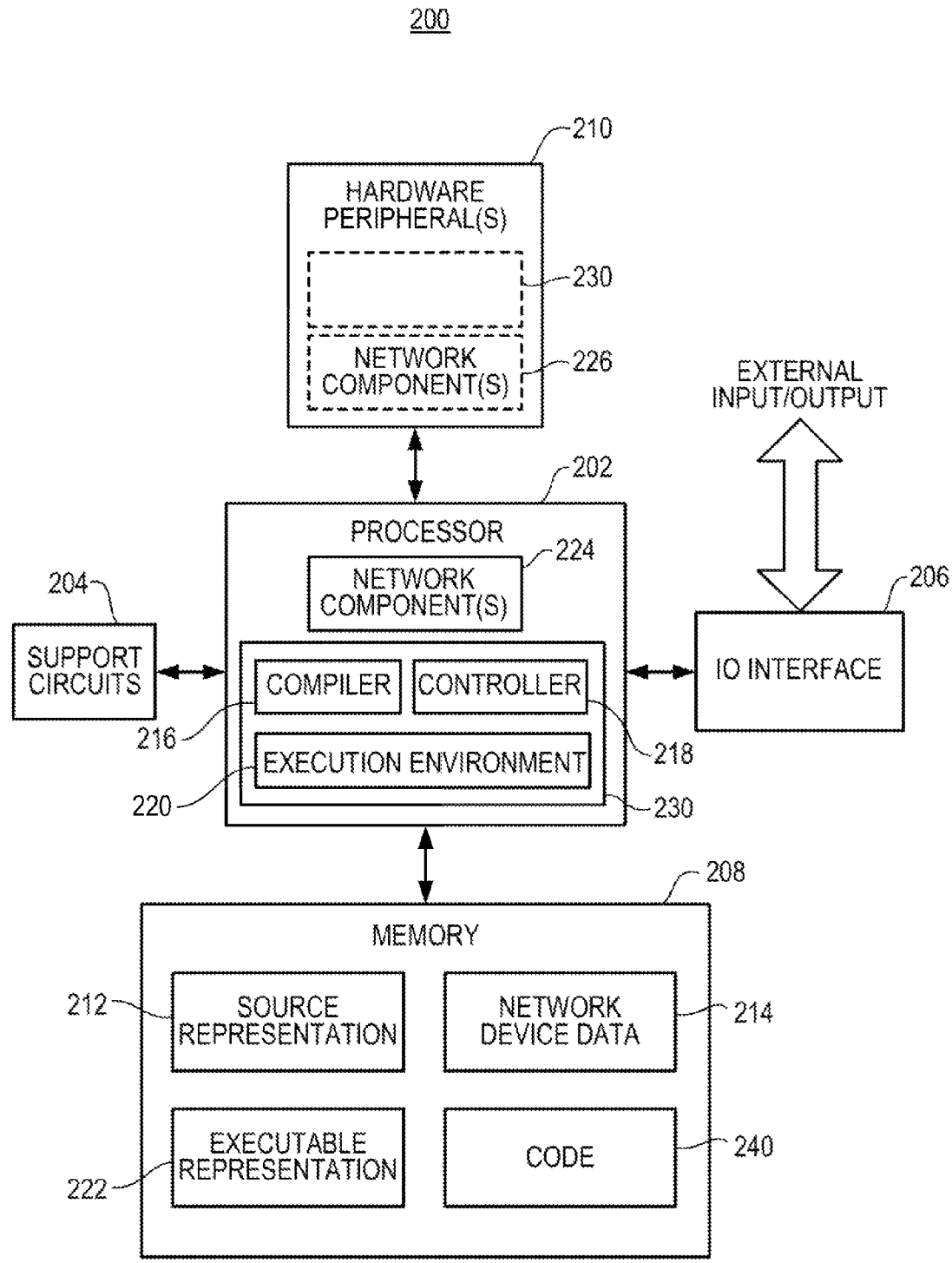
FIG. 2 is a block diagram of a network device according to another example implementation.

FIG. 2 is a block diagram of a network device 200 according to another example implementation. The network device 200 includes a processor 202, support circuits 204, an IO interface 206, a memory 208, and hardware peripheral(s) 210. The processor 202 includes any type of microprocessor, microcontroller, microcomputer, or like type computing device known in the art. The support circuits 204 for the processor can include cache, power supplies, clock circuits, data registers, IO circuits, and the like. The IO interface 206 can be directly coupled to the memory 208, or coupled to the memory 208 through the processor 202. The IO interface 206 can receive external input applied to the network device 200. The memory 208 can include random access memory, read only memory, cache memory, magnetic read/write memory, or the like or any combination of such memory devices. The hardware peripheral(s) 210 can include various hardware circuits that perform functions on behalf of the processor 202 and the network device 200.

The memory 208 stores data for the network device 200, including a source representation 212 and network device data 214. The source representation 212 can include a collection semantics defined by a language, such as a programming language (e.g., C or C++), markup language (e.g., XML), or the like. The source representation 212 defines a network device component using the semantics. In an example, a portion of the semantics can be pre-compiled external to the network device 200. Thus, the source representation 212 can have a collection of semantics (e.g., source code) and a machine-readable portion (e.g., machine or object code pre-compiled from source), or a collection of semantics without a pre-compiled portion. Any pre-compiled portion of the source representation 212 can be device-independent such that the source representation 212 can be deployed to network devices having various hardware architectures. Any semantic description in the source representation 212 can also be device-independent.

The network device data 214 includes data generated by or for the network device 200. The network device data 214 can include data used to configure deployment of the network device 200 ("deployment data"). The deployment data can include parameters, attributes, settings, and the like that are particular the deployment of the network device 100 in a network (e.g., particular internet protocol (IP) addresses, network deployment localities, etc.). The network device data 214 can also include runtime data. The runtime data can include statistics, or any analysis of such statistics, generated by the network device 200 during network traffic processing. The runtime data can be generated by any network device component of the network device 200.

In an example, the processor 202 implements a compiler 216, a controller 218, and an execution environment 220 to provide the functions described below. The memory 208 can store code 240 that is executed or interpreted by the processor 202 to implement the compiler 216, the controller 218, and the execution environment 220.

In particular, the compiler 216 obtains the source representation 212 as parametric input. The compiler 216 processes the source representation 212 to generate an executable representation 222. The executable representation 222 can include machine readable code that is executable by the processor 202 within the execution environment 220 to implement a network device component 224. The compiler 216 can also obtain the network device data 214 as parametric input. The compiler 216 can use the network device data 214 for compiler optimization when generating the executable representation 222. That is, the executable representation 222 can be "optimized" for the network device 200 based on the network device data 214. Various types of optimizations that may be employed are discussed above with respect to FIG. 1.

The execution environment 220 provides an interface or "operating system" between the executable representation 222 and the processor 202 to provide an execution engine. The executable representation 222 is executed within an execution engine provided by the execution environment 220 to implement a network component 224.

The controller 218 can provide various control functions for the network device 200. The controller 218 can request and obtain the source representation 212 through the IO interface 206 (e.g., the source representation 212 can be sent to the network device 200 over a network). The source representation 212 can be modified during the life of the network device 100 (e.g., upgraded, patched, etc.) any number of times. Upon receiving a new version of the source representation 212, the controller 218 can cause the compiler 216 to generate a new executable representation 222 thereby generating a new implementation of a network device component 224. Thus, the controller 218 can cause dynamic generation of the executable representation 222 within the network device 200, and hence dynamic implementations and re-implementations of a respective network component 224.

The controller 218 can also cause the compiler 216 to re-compile the same version of the source representation 212 with different network device data 214. The controller 218 can cause the compiler 216 to generate a new executable representation 222 with different optimizations obtained from the network device data 214. For example, after the executable representation 222 is executed, various statistics can be collected through implementation of a network device component 224 that processes network traffic. These statistics can be used to provide further optimization of the executable representation 222, as discussed above with respect to FIG. 1.

The compiler 216, the controller 218, and the execution environment 220 have been described as a component group 230 implemented by the processor 202. In some examples, the compiler 216, the controller 218, or the execution environment 220 (or any combination thereof) can be implemented as a dedicated circuit on the hardware peripheral(s) 210. For example, the hardware peripheral(s) 210 can include a programmable logic device (PLD), such as a field programmable gate array (FPGA), which can be programmed to implement the functions of the compiler 216, the controller 218, and/or the execution environment 220. The component group 230 can be implemented as a combination of a processor executing code and dedicated circuitry in hardware peripheral(s). Likewise, at least one network component 226 can be implemented as a circuit on the hardware peripheral(s) 210. For example, the executable representation 222 can be in the form of configuration data for a PLD such that the PLD implements a network device component 226 as a dedicated circuit. In general, the component group 230 and the network component(s) 226 comprise a processor circuit, whether such elements are implemented by the processor 202, the hardware peripheral(s) 210, or both.

For purposes of clarity by example, the network device 200 has been described with respect to a single source representation being compiled to implement a given network device component. In a more general example, the network device 200 can implement a plurality of network device components, each being generated by compiling respective source representations. The network device components can be implemented as processor readable code, hardware, or a combination thereof.

Figure 3:
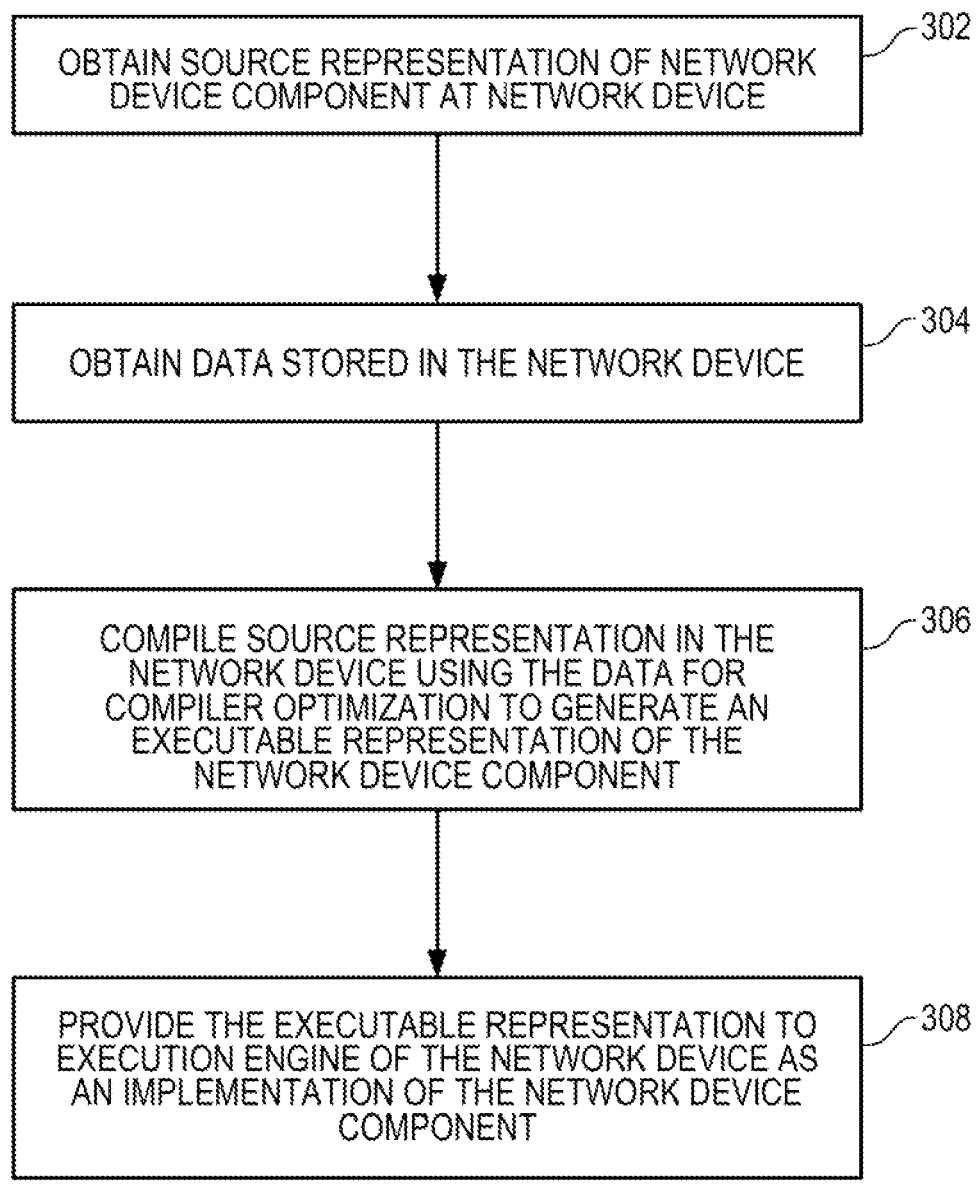
FIG. 3 is a flow diagram showing a method 300 implementing a network device component in a network device according to an example implementation.

FIG. 3 is a flow diagram showing a method 300 of implementing a network device component in a network device according to an example implementation. The method 300 begins at step 302, where a source representation of the network device component is obtained at the network device. At step 304, data stored in the network device is obtained. At step 306, the source representation is compiled in the network device using the data for compiler optimization to generate an executable representation of the network device component. At step 308, the executable representation is provided to an execution engine of the network device as an implementation of the network device component. In an example, the data obtained at step 304 includes runtime data generated by the execution engine. The data obtained at step 304 can also include deployment data representing a configuration of the network device. The data obtained at step 304 can include a combination of deployment data and runtime data. In an example, the source representation includes source code or a combination of source code and pre-compiled source code.

Figure 4:
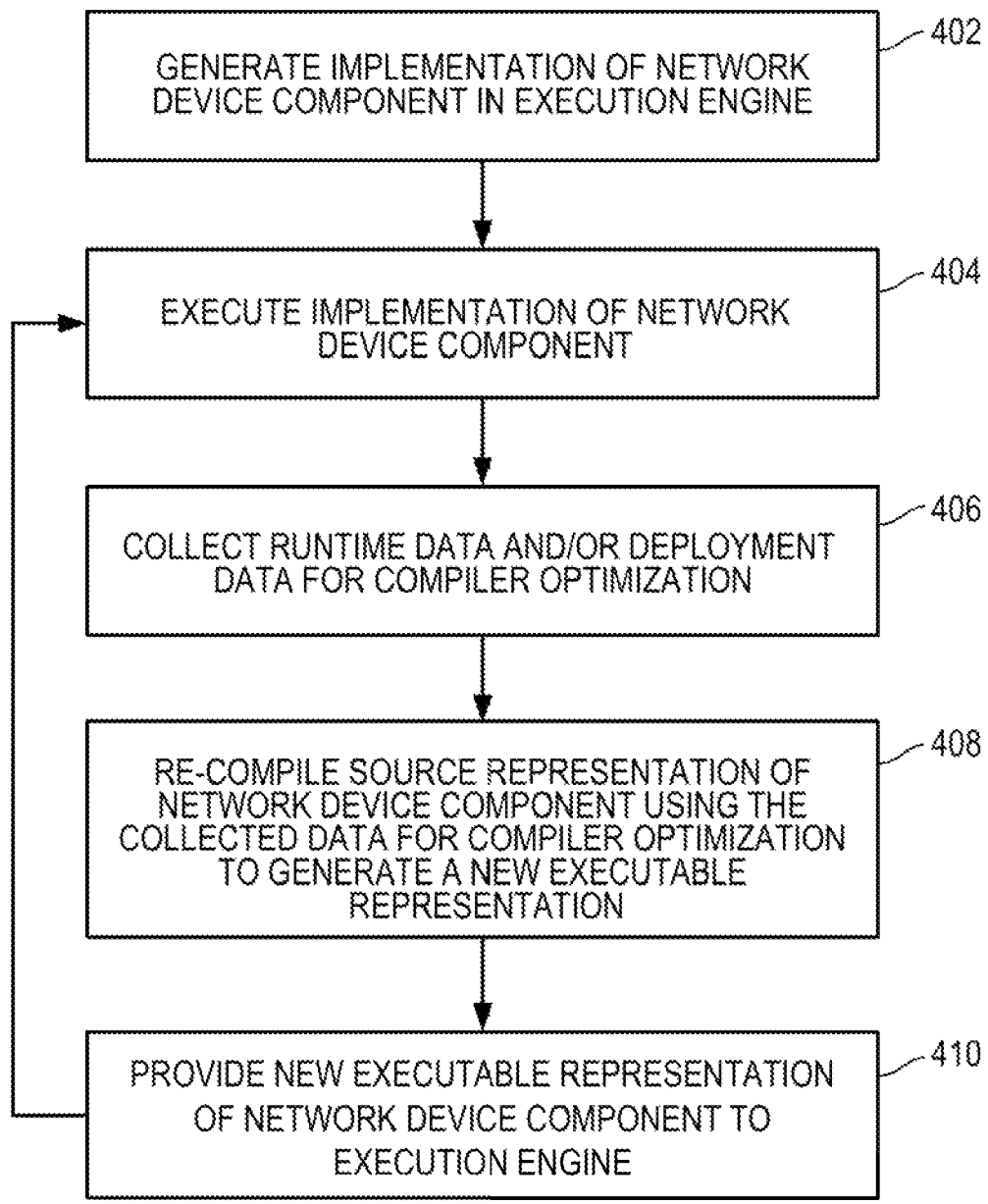
FIG. 4 is a flow diagram showing a method of implementing a network device component in a network device according to another example implementation.

FIG. 4 is a flow diagram showing a method 400 of implementing a network device component in a network device according to another example implementation. The method 400 begins at step 402, where an implementation of the network device component is generated in an execution engine of the network device. For example, the method 300 may be executed in step 402. At step 404, the network device implementation is executed. The network device implementation can be executed to process data (e.g., network traffic) and produce runtime data as a result (e.g., traffic statistics). At step 406, runtime data and/or deployment data is collected for compiler optimization. At step 408, the source representation is re-compiled using the collected data for compiler optimization to generate a new executable representation. At step 410, the new executable representation is provided to the execution engine. The method 400 can return to step 404 and repeat to further optimize the executable representation of the network device component.

Implementation of network device components in network devices has been described. In various examples, a network device includes a compiler co-located with a runtime execution environment in order to dynamically generate implementations of network device components from source representations that have network domain optimizations. Co-locating the compilation process with the runtime execution environment provides for reduced overhead, deployment/configuration specific optimizations, and runtime data specific optimizations.

The techniques described above may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc., just to name a few. Other new and various types of computer-readable media may be used to store machine readable code discussed herein.

In the foregoing description, numerous details are set forth to provide an understanding of the present invention. However, it will be understood by those skilled in the art that, the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of implementing a network device component in a network device, comprising:
    obtaining, by the network device, a source representation of the network device component;
    obtaining data stored in the network device, the obtained data comprising runtime data representing statistics related to packets processed during operation of the network device, and deployment data comprising an Internet Protocol address of the network device;
    compiling, by a compiler in the network device, the source representation using the obtained data for compiler optimization to generate an executable representation of the network device component; and
    executing the executable representation of the network device component by an execution engine in the network device.

2. The method of claim 1, further comprising:
    generating further runtime data responsive to the executing of the executable representations of the network device component by the execution engine;
    re-compiling the source representation using the further runtime data to generate a further executable representation of the network device component; and
    executing the further executable representation of the network device component by the execution engine.

3. The method of claim 1, wherein the obtaining of the source representation comprises:
    obtaining an un-compiled source code or a partially compiled source code.

4. The method of claim 1, wherein the executing of the executable representation of the network device component comprises executing an executable representation of a network switch or a network router.

5. A network device, comprising:
    a processor;
    a compiler executable by the processor to generate an executable representation of a network device component by compiling, using network device data, a source code for the network device component, the network device data comprising runtime data including statistics related to packets processed during operation of the network device, and configuration data comprising an Internet Protocol address of the network device; and
    an execution engine executable by the processor to execute the executable representation of the network device component.

6. The network device of claim 5, wherein the source code comprises un-compiled source code or partially compiled source code.

7. The network device of claim 5, wherein the executable representation of the network device component comprises an executable representation of a network switch or a network router.

8. The network device of claim 5, wherein the executing of the executable representation of the network device component produces further runtime data, and wherein the compiler is executable by the processor to further compile the source code using the further runtime data, to produce a further executable representation of the network device component, and
    wherein the execution engine is executable by the processor to execute the further executable representation of the network device component.

9. A network device, comprising:
    an input/output (IO) interface to receive a source representation of a network device component, the source representation being un-compiled or partially compiled;
    a memory to store the source representation and network device data; and
    a processor, coupled to the memory, to generate an executable representation of the network device component through compilation of the source representation using the network device data for compiler optimization, and to execute the executable representation to implement the network device component, wherein the network device data comprises runtime data representing statistics generated by the processor, the statistics related to processing of packets, and the network device data further comprises configuration data including an Internet Protocol address of the network device.

10. The network device of claim 9, wherein the runtime data is generated by the network device component as implemented by the processor.

11. The network device of claim 9, wherein the source representation comprises un-compiled source code or partially compiled source code.

12. The network device of claim 9, wherein the executable representation of the network device component comprises an executable representation of a network switch or a network router.

13. The network device of claim 12, wherein the statistics are related to the processing of packets by the executable representation of the network switch or the network router.

* * * * *